United States Patent
Hancock

(10) Patent No.: US 9,759,456 B2
(45) Date of Patent: Sep. 12, 2017

(54) COMBINED HEAT AND POWER HEAT PUMP

(75) Inventor: Stephen Stewart Hancock, Flint, TX (US)

(73) Assignee: Trane International Inc., Piscataway, NJ (US)

( * ) Notice: Subject to any disclaimer, the term of this patent is extended or adjusted under 35 U.S.C. 154(b) by 556 days.

(21) Appl. No.: 13/565,535

(22) Filed: Aug. 2, 2012

(65) Prior Publication Data

US 2014/0033743 A1   Feb. 6, 2014

(51) Int. Cl.
F25B 27/00 (2006.01)
F25B 13/00 (2006.01)
F25B 27/02 (2006.01)

(52) U.S. Cl.
CPC ............. *F25B 13/00* (2013.01); *F25B 27/02* (2013.01); *F25B 2327/001* (2013.01)

(58) Field of Classification Search
CPC .......... F25B 30/02; F25B 27/02; F25B 30/06; F25B 2327/00; F25B 13/00; F25B 2327/001; F25B 27/00; Y02E 20/14; Y02T 10/16
USPC .............................................. 62/238.1, 238.7
See application file for complete search history.

(56) References Cited

U.S. PATENT DOCUMENTS

| | | | |
|---|---|---|---|
| 4,091,636 A | 5/1978 | Margen | |
| 4,371,111 A | 2/1983 | Pernosky | |
| 4,380,156 A | 4/1983 | Ecker | |
| 4,539,942 A * | 9/1985 | Kobayashi | F01P 7/08 123/41.1 |
| 4,576,011 A | 3/1986 | Glamm et al. | |
| 5,000,011 A * | 3/1991 | Hayakawa | F24F 1/022 62/243 |
| 5,226,594 A * | 7/1993 | Swenson | 237/2 B |
| 5,253,805 A * | 10/1993 | Swenson | 237/2 B |
| 5,345,786 A | 9/1994 | Yoda et al. | |
| 5,772,113 A | 6/1998 | Gerstmann et al. | |
| 5,906,104 A | 5/1999 | Schwartz et al. | |
| 6,370,903 B1 | 4/2002 | Wlech | |
| 6,425,257 B1 * | 7/2002 | Ohseki | B60H 1/00885 62/244 |
| 6,530,753 B2 | 3/2003 | Aramaki | |

(Continued)

FOREIGN PATENT DOCUMENTS

| CN | 101871700 A | 10/2010 |
|---|---|---|
| DE | 10133733 A1 | 1/2003 |

(Continued)

OTHER PUBLICATIONS

PCT International Search Report; PCT Application No. PCT/US2013/052923; Dec. 6, 2013; 4 pgs.

(Continued)

*Primary Examiner* — Allen Flanigan
*Assistant Examiner* — Filip Zec
(74) *Attorney, Agent, or Firm* — Conley Rose, P.C.; J. Robert Brown, Jr.

(57) ABSTRACT

A method of operating a heating, ventilation, and/or air conditioning (HVAC) system includes operating a device to produce at least one of electricity and rejected heat and at least one of (1) powering a component of the HVAC system using the electricity produced by the electricity generating device and (2) heating the refrigerant of the HVAC system using at least a portion of the rejected heat.

16 Claims, 3 Drawing Sheets

(56) References Cited

U.S. PATENT DOCUMENTS

| | | |
|---|---|---|
| 6,615,602 B2 | 9/2003 | Wilkinson |
| 6,694,766 B1 | 2/2004 | Johnson, Jr. et al. |
| 6,769,481 B2 * | 8/2004 | Yoshimura ................ F02G 5/00 |
| | | 165/231 |
| 7,067,208 B2 | 6/2006 | Gottmann et al. |
| 7,160,641 B2 | 1/2007 | Jorgensen et al. |
| 7,240,504 B2 * | 7/2007 | Cho ......................... F02G 5/02 |
| | | 62/238.7 |
| 7,258,169 B2 | 8/2007 | Fripp et al. |

FOREIGN PATENT DOCUMENTS

| | | |
|---|---|---|
| DE | 102009054126 A1 | 5/2011 |
| EP | 1628092 A2 | 2/2006 |
| JP | H1054619 A | 2/1998 |
| JP | 2005331147 A | 12/2005 |

OTHER PUBLICATIONS

PCT Written Opinion of the International Searching Authority; PCT Application No. PCT/US2013/052923; Dec. 6, 2013; 4 pgs.

Groskreutz, Mark E.; "Fuel Cell Heat Pump;" U.S. Appl. No. 13/299,859, filed Nov. 18, 2011.

Chinese Office Action; Application No. 201380047720.7 dated Dec. 3, 2015; 21 pages.

Chinese Office Action; Application No. 201380047720.7; Jul. 13, 2016; 19 pages.

Chinese Office Action; Application No. 201380047720.7; Jan. 18, 2017; 7 pages.

* cited by examiner

COMBINED HEAT AND POWER HEAT PUMP

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Heating, ventilation, and/or air conditioning systems (HVAC systems) are used in residential and/or commercial areas for heating and/or cooling to create comfortable temperatures inside those areas. These temperature controlled areas may be referred to as comfort zones. Some HVAC systems are heat pump systems. Heat pump systems are generally capable of cooling a comfort zone by operating in a cooling mode for transferring heat from a comfort zone to an ambient zone using a refrigeration cycle (i.e., Reverse Rankine cycle). Heat pump systems are also generally capable of reversing the direction of refrigerant flow through the components of the HVAC system so that heat is transferred from the ambient zone to the comfort zone (a heating mode), thereby heating the comfort zone. The efficiency of an HVAC system may be quantified by a coefficient of performance (COP) which is a measure to describe the ratio of useful heat movement to work input, which substantially equates to electrical energy input.

SUMMARY OF THE DISCLOSURE

In some embodiments, a method of operating a heating, ventilation, and/or air conditioning (HVAC) system is provided. The method may comprise operating a device to produce at least one of electricity and rejected heat and at least one of (1) powering a component of the HVAC system using the electricity produced by the electricity generating device and (2) heating the refrigerant of the HVAC system using at least a portion of the rejected heat.

In other embodiments, a method of operating a heating, ventilation, and/or air conditioning (HVAC) system is provided that may comprise circulating a fluid in a circulatory loop between a device of the HVAC system, the device being configured to generate at least one of electricity and heat, and a recovery heat exchanger of the HVAC system, transferring heat to the fluid from the device, and selectively transferring heat from the fluid to a refrigerant via the recovery heat exchanger.

In still other embodiments, a heating, ventilation, and/or air conditioning (HVAC) system is provided. The HVAC system may comprise a device configured to generate at least one of electricity and rejected heat, a recovery heat exchanger, and a circulatory loop configured to selectively circulate a fluid between the device and the recovery heat exchanger associated with a refrigerant of the HVAC system.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

This disclosure provides systems and methods for operating an HVAC system comprising an electricity generation device to produce electricity for consumption by a heat pump of the HVAC system while also using rejected heat from the electricity generation device as an additional heat source for the HVAC system. While in the heating mode, the HVAC system may utilize a recovery heat exchanger to transfer the rejected heat to the refrigerant of the heat pump. While in the cooling mode, the HVAC system utilizes a discharge heat exchanger associated with the outdoor unit to transfer the rejected heat to the ambient zone instead of the refrigerant.

Figure 1:
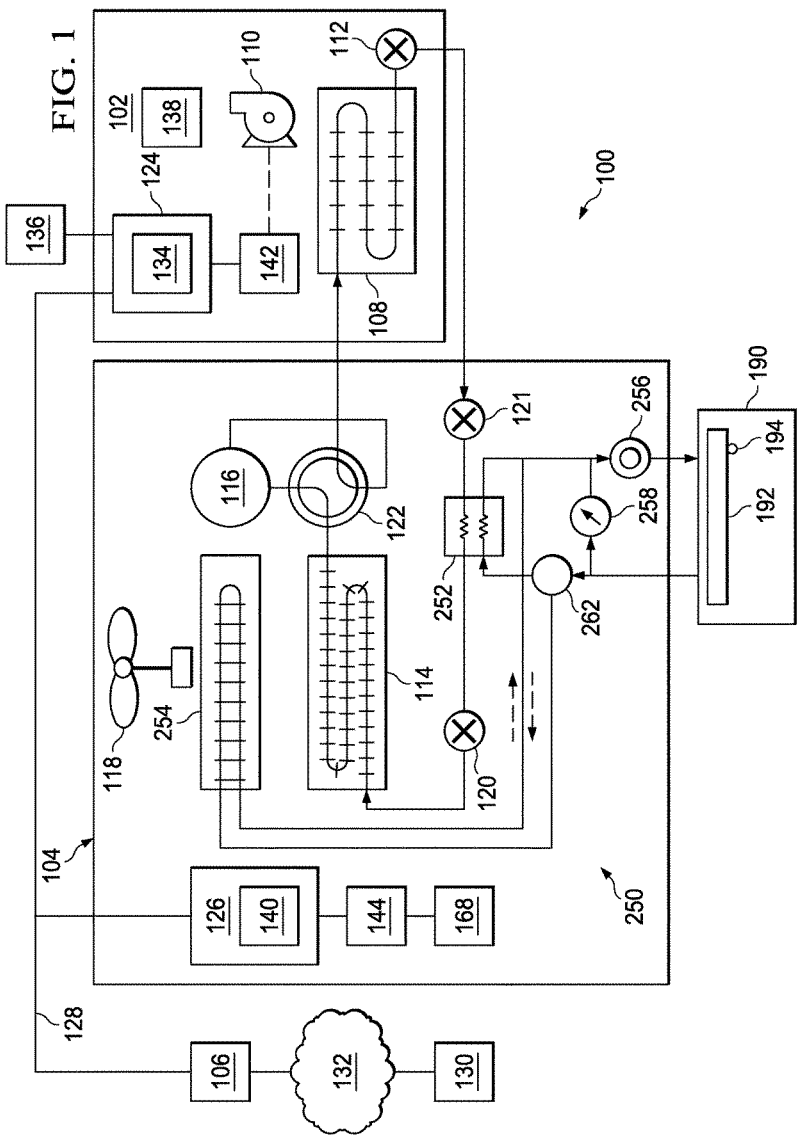
FIG. 1 is a schematic diagram of an HVAC system according to an embodiment of the disclosure.

Referring now to FIG. 1, a simplified schematic diagram of an HVAC system 100 according to an embodiment of this disclosure is shown. HVAC system 100 comprises an indoor unit 102, an outdoor unit 104, and a system controller 106. In some embodiments, the system controller 106 may operate to control operation of the indoor unit 102 and/or the outdoor unit 104. As shown, the HVAC system 100 is a so-called heat pump system that may be selectively operated to implement one or more substantially closed thermodynamic refrigeration cycles to provide a cooling functionality and/or a heating functionality. In an embodiment, HVAC system 100 comprises an air-to-air heat pump. In the embodiment of FIG. 1, the outdoor unit 104 comprises a recovery heat exchanger 252 and a discharge heat exchanger 254. Further, the HVAC system 100 comprises an electricity generator 190, and a fluid circulation loop 250 connecting the heat exchangers 252, 254 and the generator 190. Generator 190 is configured to produce and supply electricity and/or rejected heat and thereby to provide at least a portion of the energy consumption and/or heat delivery of HVAC system 100.

Indoor unit 102 comprises an indoor heat exchanger 108, an indoor fan 110, and an indoor metering device 112. Indoor heat exchanger 108 is a plate fin heat exchanger configured to allow heat exchange between refrigerant carried within internal tubing of the indoor heat exchanger 108 and fluids that contact the indoor heat exchanger 108 but that are kept segregated from the refrigerant. In other embodiments, indoor heat exchanger 108 may comprise a spine fin heat exchanger, a microchannel heat exchanger, or any other suitable type of heat exchanger.

The indoor fan 110 is a centrifugal blower comprising a blower housing, a blower impeller at least partially disposed within the blower housing, and a blower motor configured to selectively rotate the blower impeller. In other embodiments, the indoor fan 110 may comprise a mixed-flow fan and/or any other suitable type of fan. The indoor fan 110 is configured as a modulating and/or variable speed fan capable of being operated at many speeds over one or more ranges of speeds. In other embodiments, the indoor fan 110 may be configured as a multiple speed fan capable of being operated at a plurality of operating speeds by selectively electrically powering different ones of multiple electromagnetic windings of a motor of the indoor fan 110. In yet other embodiments, the indoor fan 110 may be a single speed fan.

The indoor metering device 112 is an electronically controlled motor driven electronic expansion valve (EEV). In alternative embodiments, the indoor metering device 112 may comprise a thermostatic expansion valve, a capillary tube assembly, and/or any other suitable metering device. The indoor metering device 112 may comprise and/or be associated with a refrigerant check valve and/or refrigerant bypass for use when a direction of refrigerant flow through the indoor metering device 112 is such that the indoor metering device 112 is not intended to meter or otherwise substantially restrict flow of the refrigerant through the indoor metering device 112.

Outdoor unit 104 comprises an outdoor heat exchanger 114, a compressor 116, an outdoor fan 118, an outdoor metering device 120, and a reversing valve 122. Outdoor heat exchanger 114 is a spine fin heat exchanger configured to allow heat exchange between refrigerant carried within internal passages of the outdoor heat exchanger 114 and fluids that contact the outdoor heat exchanger 114 but that are kept segregated from the refrigerant. In other embodiments, outdoor heat exchanger 114 may comprise a plate fin heat exchanger, a microchannel heat exchanger, or any other suitable type of heat exchanger.

The compressor 116 is a multiple speed scroll type compressor configured to selectively pump refrigerant at a plurality of mass flow rates. In alternative embodiments, the compressor 116 may comprise a modulating compressor capable of operation over one or more speed ranges, the compressor 116 may comprise a reciprocating type compressor, the compressor 116 may be a single speed compressor, and/or the compressor 116 may comprise any other suitable refrigerant compressor and/or refrigerant pump.

The outdoor fan 118 is an axial fan comprising a fan blade assembly and fan motor configured to selectively rotate the fan blade assembly. In other embodiments, the outdoor fan 118 may comprise a mixed-flow fan, a centrifugal blower, and/or any other suitable type of fan and/or blower. The outdoor fan 118 is configured as a modulating and/or variable speed fan capable of being operated at many speeds over one or more ranges of speeds. In other embodiments, the outdoor fan 118 may be configured as a multiple speed fan capable of being operated at a plurality of operating speeds by selectively electrically powering different ones of multiple electromagnetic windings of a motor of the outdoor fan 118. In yet other embodiments, the outdoor fan 118 may be a single speed fan.

The outdoor metering device 120 is a thermostatic expansion valve. In alternative embodiments, the outdoor metering device 120 may comprise an electronically controlled motor driven EEV, a capillary tube assembly, and/or any other suitable metering device. The outdoor metering device 120 may comprise and/or be associated with a refrigerant check valve and/or refrigerant bypass for use when a direction of refrigerant flow through the outdoor metering device 120 is such that the outdoor metering device 120 is not intended to meter or otherwise substantially restrict flow of the refrigerant through the outdoor metering device 120.

In some embodiments, the indoor EEV controller 138 may be configured to receive information regarding temperatures and pressures of the refrigerant in the indoor unit 102. More specifically, the indoor EEV controller 138 may be configured to receive information regarding temperatures and pressures of refrigerant entering, exiting, and/or within the indoor heat exchanger 108. Further, the indoor EEV controller 138 may be configured to communicate with the indoor metering device 112 and/or otherwise affect control over the indoor metering device 112. The indoor EEV controller 138 may be configured to communicate with the outdoor metering device 120 and/or otherwise affect control over the outdoor metering device 120.

The outdoor controller 126 may be coupled to the outdoor unit 104 and may be configured to receive information inputs, transmit information outputs, and otherwise communicate with the system controller 106, the indoor controller 124, and/or any other device via the communication bus 128 and/or any other suitable medium of communication. In some embodiments, the outdoor controller 126 may be configured to communicate with an outdoor personality module 140 that may comprise information related to the identification and/or operation of the outdoor unit 104. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the outdoor fan 118, a compressor sump heater, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with a compressor drive controller 144 that is configured to electrically power and/or control the compressor 116 and, in at least some embodiments, to communicate with an outdoor indoor EEV controller 168.

In FIG. 1, the HVAC system 100 is shown configured for operating in a so-called heating mode in which heat is absorbed by a refrigerant at the outdoor heat exchanger 114 and heat is rejected by refrigerant at the indoor heat exchanger 108. In some embodiments, the compressor 116 may be operated to compress refrigerant and pump the relatively high temperature and high pressure compressed refrigerant from the compressor 116 to the indoor heat exchanger 108 through the reversing valve 122. From the indoor heat exchanger 108, the refrigerant may be pumped unaffected through the indoor metering device 112 to the outdoor metering device 120 and ultimately to the outdoor heat exchanger 114. The refrigerant may experience a pressure differential across the outdoor metering device 120, be passed through the outdoor heat exchanger 114, and ultimately reenter the compressor 116. As the refrigerant is passed through the outdoor heat exchanger 114, the outdoor fan 118 may be operated to move air into contact with the outdoor heat exchanger 114, thereby transferring heat from the air surrounding the outdoor heat exchanger 114 to the refrigerant. The refrigerant may thereafter re-enter the compressor 116 after passing through a second internal passage within the reversing valve 122.

Alternatively, to operate the HVAC system 100 in a so-called cooling mode, most generally, the roles of the indoor heat exchanger 108 and the outdoor heat exchanger 114 are reversed as compared to their operation in the above-described heating mode. For example, the reversing valve 122 may be controlled to alter the flow path of the refrigerant, the indoor metering device 112 may be enabled, and the outdoor metering device 120 may be disabled and/or bypassed. In cooling mode, heat is absorbed by refrigerant at the indoor heat exchanger 108 and heat is rejected by the refrigerant at the outdoor heat exchanger 114. As the refrigerant is passed through the indoor heat exchanger 108, the indoor fan 110 may be operated to move air into contact with the indoor heat exchanger 108, thereby transferring heat to the refrigerant from the air surrounding the indoor heat exchanger 108.

As introduced earlier, the HVAC system 100 of FIG. 1 comprises the generator 190, the fluid circulation loop 250, the recovery heat exchanger 252, and the discharge heat exchanger 254. Generator 190 may comprise a heat exchanger 192. Outdoor unit 104 may further comprise an additional metering device 121 coupled to recovery heat exchanger 252 for the passage of refrigerant therethrough. However, some embodiments may not include metering device 121.

The additional metering device 121 may comprise a fixed orifice component, for example a capillary tube assembly. In alternative embodiments, the metering device 121 may comprise a thermostatic expansion valve, an electronically controlled motor driven EEV, and/or any other suitable metering device. The metering device 121 may comprise and/or be associated with a refrigerant check valve and/or refrigerant bypass for use when a direction of refrigerant flow through the metering device 121 is such that the metering device 121 is not intended to meter or otherwise substantially restrict flow of the refrigerant through the outdoor metering device 120.

Loop 250 may be configured to selectively circulate a fluid between the heat exchanger 192 in generator 190 and the heat exchangers 252, 254 of outdoor unit 104. The fluid may comprise water, a water and ethylene glycol mixture, a brine solution, a refrigerant, an oil, or any other suitable heat transfer fluid. The fluid may be referred to as a heat transfer fluid, a generator coolant, or simply a coolant. In some embodiments, the heat transfer fluid may be utilized to transfer heat, i.e. rejected heat, from generator 190 to the refrigerant of HVAC system 100

The loop 250 may comprise a plurality of pipes, tubes, and/or any other suitable conduit which may comprise one or more of a variety of rigid or flexible materials, e.g., polyvinyl chloride (PVC/uPVC), ductile iron, steel, cast iron, polypropylene, polyethylene, copper, hose with a braded sheath, and/or any other suitable material. Loop 250 also comprises a coolant pump 256, a mixing valve 258, and a diverter valve 262. The pump 265 may pump the heat transfer fluid into inlet tubing associated with heat exchanger 192, through the heat exchanger 192, out of the heat exchanger 192 through outlet tubing associated with the heat exchanger 192, and subsequently to heat exchangers 252 and/or 254 prior to returning the heat transfer fluid to the heat exchanger 192. The valves of loop 250 may open and close in response to an external stimulus, e.g., a heating or cooling mode selection by a controller 106, 124, 126 or a difference between a measured fluid temperature and a fluid temperature set-point. For example, when HVAC system 100 is in the so-called heating mode, coolant diverter valve 262 may direct at least a portion of the heat transfer fluid to recovery heat exchanger 252. Valve 262 may direct heat transfer fluid along a different flow path during operation of HVAC system 100 in a different operation mode, such as a cooling mode.

In at least some embodiments, loop 250 may comprise a reservoir tank to accumulate a portion of the heat transfer fluid. The loop 250 may be configured for the heat transfer fluid to operate at atmospheric pressure and/or at one or more values of pressure above or below atmospheric pressure. The operating pressure in loop 250 may vary during operation. In some embodiments, circulation loop 250 may comprise additional components configured to accommodate use of a phase changing fluid, such as a liquid-vapor separator component and a pressure relief valve component. In some embodiments, circulation loop 250 may comprise at least one of water, a single phase coolant, and a two phase coolant.

Generator 190 may comprise a thermostat or temperature sensor 194, which may measure fluid temperature, a conduit temperature, and/or an internal temperature of the generator 190. In some embodiments, the loop 250 may comprise one or more thermostats or temperature sensors to measure temperatures associated with the circulated fluid. In some embodiments, if a temperature associated with heat exchanger 192 drops below a temperature set-point, coolant mixing valve 258 may direct a portion of the heat transfer fluid that has received rejected heat to circulate within loop 250 and return to heat exchanger 192 without passing through a heat exchanger 252, 254. Thus, at least a portion of the rejected heat may be directed back to heat exchanger 192, i.e. to the electricity generating device, where the returning heat may help maintain a generator operating temperature and/or may receive additional heat to reach a threshold temperature for triggering transfer of the heat to at least one of the heat exchangers 252, 254.

Figure 2:
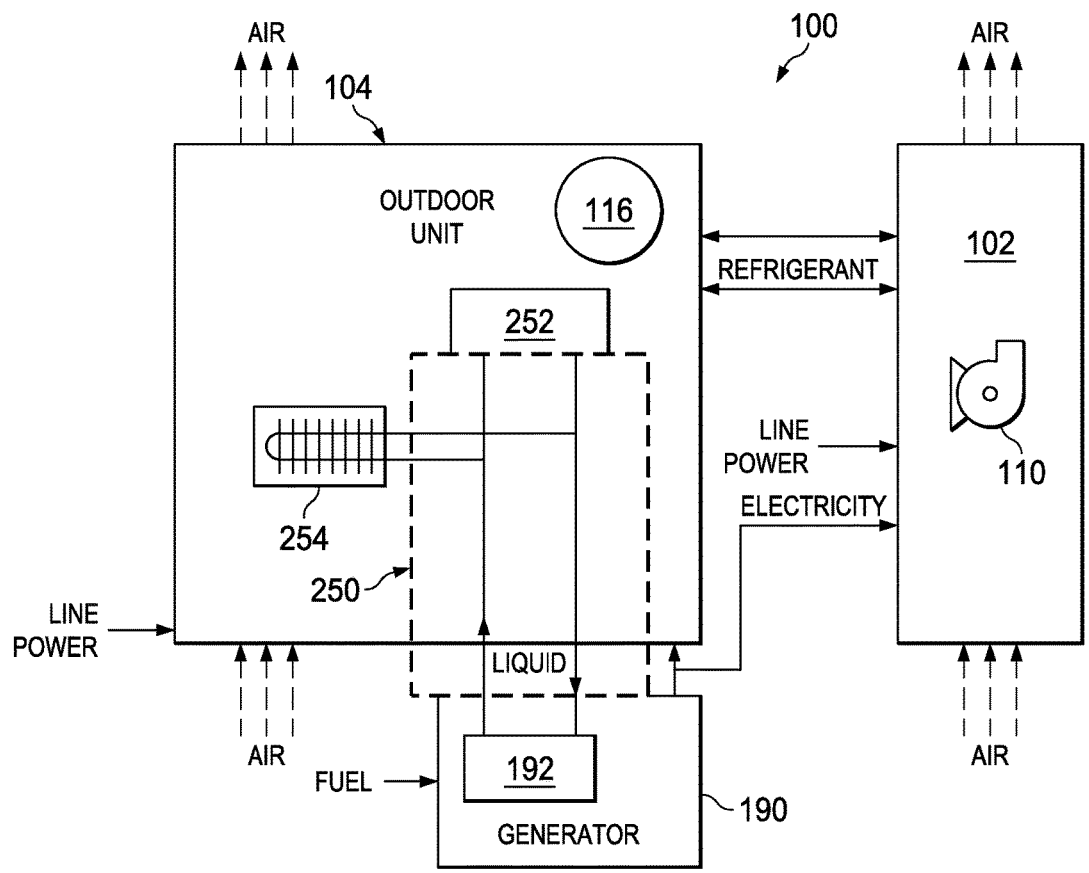
FIG. 2 is another schematic diagram of the HVAC system of FIG. 1.

Referring now to FIG. 2, another schematic diagram of HVAC system 100 is shown. The generator 190 may be configured to supply electricity and/or heat to one or more components of the outdoor unit 104. For example, compressor 116, blower 110 of the inside unit 102, and/or any other component of HVAC system 100 may be powered by electricity generated by generator 190. The generator 190 may comprise an electricity generating device comprising and/or powered by an internal combustion engine configured to receive and consume a fuel such as natural gas, propane, gasoline, and/or diesel. In alternative embodiments, the electricity generator 190 may be may be replaced with another electricity generating device such as, for example, a fuel cell, a generator powered by a micro-turbine, a thermal-photovoltaic system, and/or any other suitable device capable of supplying electrical power and/or heat. A variety of combinations fuels and oxidants may be used. Additional examples of fuels are hydrogen, hydrocarbons, alcohols, and biomass. Examples of oxidants are air, oxygen, chlorine, and chlorine dioxide. A thermal-photovoltaic system may convert solar energy into electricity and/or heat and provide a portion of the power produced to HVAC system 100 without a supply of fuel or oxidizer.

The rejected heat from the generator 190 may be utilized for an HVAC system functionality to increase the efficiency of the HVAC system 100. For example, referring to FIG. 1, when the HVAC system 100 is operating in the heating mode, the rejected heat may be directed first to the outdoor unit 104 and then to indoor unit 102 for heating a space to which the indoor unit 102 supplies air. This benefit may be achieved through the transfer of heat, i.e. thermal energy, from the heat transfer fluid in loop 250 to the refrigerant via recovery heat exchanger 252. Transferring the rejected heat to the refrigerant may augment the transfer of heat occurring within outdoor heat exchanger 114. The transfer of rejected heat from heat exchanger 192 to the refrigerant may be referred to as heat recovery.

The efficiency of the heat-pump based HVAC system 100 operating in a heating mode may exceed the efficiency of a furnace that simply burns natural gas, propane, or other fuels for the purpose of simply distributing the resultant heat of combustion. For example, in some cases, a furnace configured to combust natural gas may comprise an efficiency of about 80% to about 95% which translates to a COP of about 0.80 to about 0.95, respectively, with the furnace efficiency generally not being sensitive to outdoor ambient temperature. Comparatively, in determining an efficiency of an HVAC system 100 comprising both a heat pump and an electrical power generation source (i.e. generator 190), the efficiencies of the electrical power generation source with regard to electrical power generation efficiency and heat generation efficiency must be considered as well as the efficiency of the vapor compression cycle efficiency of the heat pump itself. In some cases, the electrical power generation source may comprise an electricity generation COP in a range of about 0.2 to about 0.4 while also comprising a heat generation COP in a range of about 0.6 to 0.4 (with a total additive COP of about 0.8) while the vapor compression cycle of the heat pump powered by the generated electricity may comprise a COP in a range of about 3.0 to about 4.0. Accordingly, such an HVAC system 100, in some less efficient embodiments, may comprise an overall system COP of about 1.2 (i.e. 0.2*3+0.6=1.2), which is greater than the COP of the above-described natural gas furnace alone. In more efficient embodiments, an HVAC system 100 may comprise an overall system COP of about 2.0 (i.e. 0.4*4.0+ 0.4=2.0), which is much more efficient than the above-described natural gas furnace alone.

The heat recovery capability of the HVAC system 100 may replace or reduce the need for use of so-called "emergency heat" or "auxiliary heat" sources such as electrical resistance heating elements with the heat pump when the heating capacity of a traditional heat pump would be insufficient to meet a heating demand. Additionally, during warmer seasons or environmental conditions, the generator 190 could be used to power the heat pump in cooling mode thereby providing an opportunity to reduce peak electrical demand and avoid high peak electrical rates. The generator 190 may also be configured to operate during electrical grid power outages to provide electricity for heating, cooling, and/or another purpose that comprises powering electrical loads.

While HVAC systems 100 are shown as a so-called split system comprising an indoor unit 102 located separately from the outdoor unit 104, alternative embodiments of an HVAC system 100 may comprise a so-called package system in which one or more of the components of the indoor unit 102 and one or more of the components of the outdoor unit 104 are carried together in a common housing or package. The HVAC system 100 is shown as a so-called ducted system where the indoor unit 102 is located remote from the conditioned zones, thereby utilizing air ducts to route the circulating air. However, in alternative embodiments, an HVAC system 100 may be configured as a non-ducted system in which the indoor unit 102 and/or multiple indoor units 102 associated with an outdoor unit 104 is located substantially in the space and/or zone to be conditioned by the respective indoor units 102, thereby utilizing fewer and/or shorter air ducts to route the air conditioned by the indoor units 102.

Figure 3:
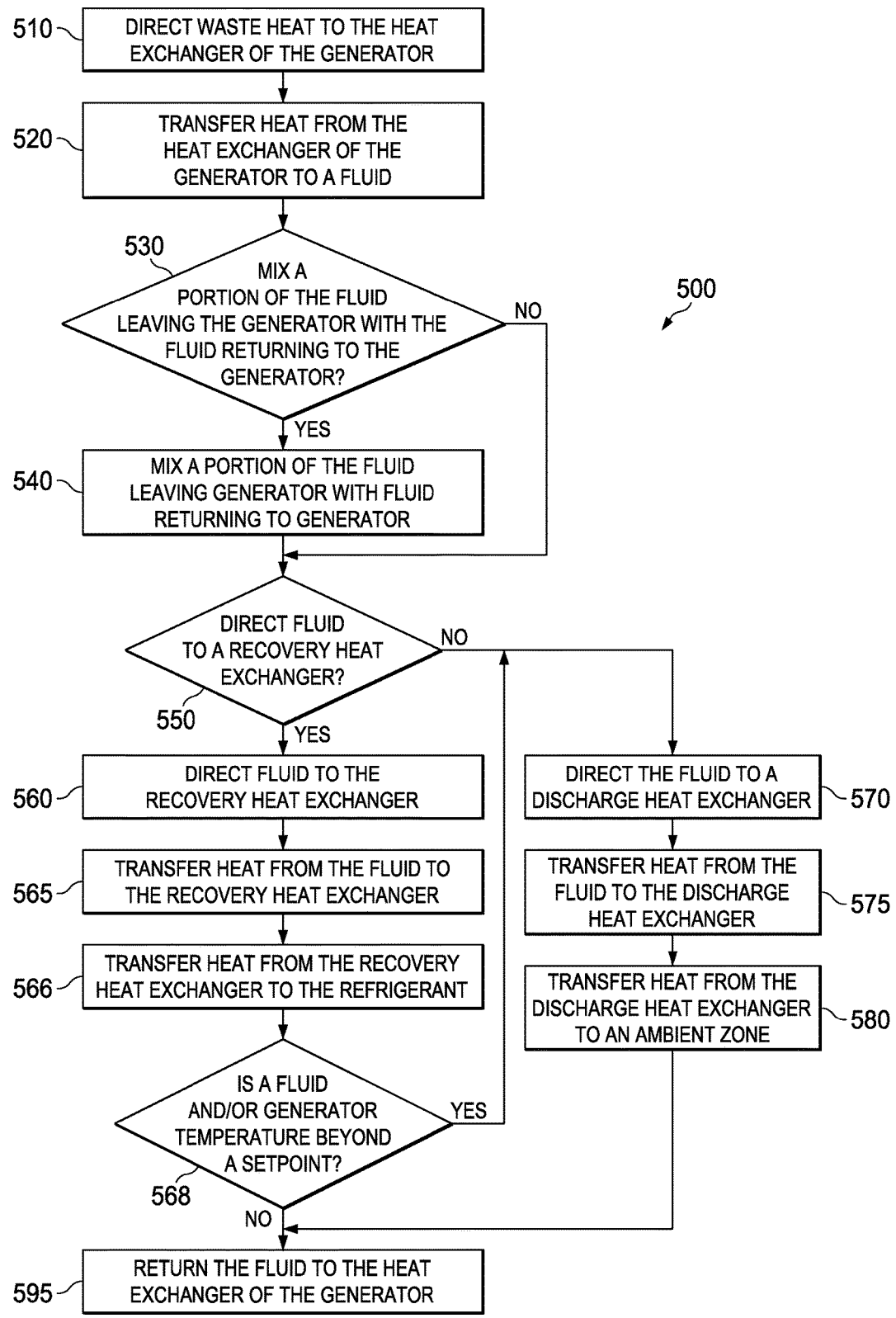
FIG. 3 is a flowchart of a method of operating an HVAC system according to an embodiment of the disclosure.

Referring now to FIG. 3, a flowchart of a method 500 of operating an HVAC system is shown. The method 500 may generally comprise directing a rejected heat from an electricity generation device to at least one of a discharge heat exchanger and a recovery heat exchanger. The method 500 may begin at block 510 where rejected heat, i.e. waste heat, from the electricity generator is directed to a heat exchanger of the electricity generator. For example, the rejected heat may be directed from the generator 190 to the heat exchanger 192. Once heat is transferred to the heat exchanger of the electricity generator, method 500 may progress to block 520. At block 520, heat may be transferred from the heat exchanger of the electricity generator to a fluid, i.e. a heat transfer fluid, within the heat exchanger of the electricity generator. In some cases, the heat transfer fluid may be carried in a circulatory loop such as the loop 250. In some embodiments, the heat transfer fluid in loop 250 may experience a thermodynamic phase change, changing between liquid and vapor, both evaporating and condensing at different locations within loop 250. For example, the heat transfer fluid may comprise water that passes through the heat exchanger 192 and resultantly receives at least a portion of the rejected heat to increase a temperature of the water and/or to generate steam. After passing through a heat exchanger 252, 254 the water and/or steam may lose heat and may condense from vapor to liquid. Thus, in some embodiments, the heat transfer fluid may remain liquid or vapor without a phase change.

As determined at block 530 and selectively accomplished at block 540, the method 500 may mix a portion of the heat transfer fluid leaving the electricity generator with the heat transfer fluid returning to the electricity generator. In some embodiments, the method 500 may determine whether or not to mix a portion of the heat transfer fluid leaving the electricity generator with the heat transfer fluid returning to the electricity generator based on a comparison between a temperature set-point for the electricity generator and a temperature associated with the electricity generator. For example, in some embodiments, if the temperature set-point of the electricity generator is set at a value of 150 degrees Fahrenheit and the temperature of the sensor 194 associated with generator 190 is less than 150 degrees Fahrenheit, the method 500 may determine at block 530 that a first portion of the heat transfer fluid leaving generator 190 should not be directed to a heat exchanger 252, 254, but rather, should be directed through coolant mixing valve 258. After exiting mixing valve 258, the first portion of the heat transfer fluid may mix with the second, presumably cooler portion of heat transfer fluid returning from a heat exchanger 252, 254. After mixing, both the first and second portions of the heat transfer fluid return to generator 190. Such may be the outcome of decision block 530 and execution block 540.

As determined at block 550 and selectively accomplished at block 560, method 500 may direct at least a portion of the heat transfer fluid to a recovery heat exchanger to provide heat to the refrigerant. For example, when the of HVAC system 100 is set to perform in the heating mode of operation, as may be set in a controller 106, 124, 126, coolant diverter valve 262 may be adjusted to direct at least a portion of the heat transfer fluid of loop 250 to flow through recovery heat exchanger 252. Accordingly, heat may be transferred from the heat transfer fluid to the recovery heat exchanger at block 565, and heat may be transferred from the recovery heat exchanger to the refrigerant at block 566. The heat transfer fluid may thereafter return to the heat exchanger of the electricity generator at block 595. In some embodiments, a metering device, such as additional metering device 121, may reduce the pressure and temperature of the refrigerant before the refrigerant passes through the recovery heat exchanger. With a reduced temperature, the refrigerant may have a greater capacity to accept the heat from the heat transfer fluid coming from the electricity generator.

Based on the determination of block 550, method 500 may, at block 570, selectively direct at least a portion of the heat transfer fluid to a discharge heat exchanger to be dumped or otherwise transferred to an ambient zone. For example, when HVAC system 100 is set to perform in the cooling mode of operation, as may be set in a controller 106, 124, 126, coolant diverter valve 262 may be adjusted to direct at least a portion of the heat transfer fluid of loop 250 to flow through discharge heat exchanger 254. Accordingly, at block 575 heat may be transferred from the heat transfer fluid to the discharge heat exchanger and then, at block 580, may be transferred to an ambient zone such as, for example, outdoor air, ground water, and/or any other suitable heat sink. The heat transfer fluid may thereafter return to the heat exchanger of the electricity generator at block 595. In some embodiments, a fan and/or blower associated with the heat transfer fluid and the discharge heat exchanger may be operated to cause heat transfer from the heat transfer fluid to the ambient zone. For example, in HVAC system 100, outdoor fan 118 may draw outdoor air into contact with discharge heat exchanger 254. In another embodiment, a dedicated fan may be associated with the discharge heat exchanger.

In some embodiments, a maximum temperature set-point may be established. For example, maximum temperature set-point may be selected to prevent damage to the associated fluid conduits (i.e. the tubing), prevent undesirably fast changes in the temperature of the refrigerant, and/or to prevent undesirable heat buildup in the electricity generator itself. For example, in some embodiments of the heating mode, if the temperature of sensor 194 experiences a temperature above the maximum temperature set-point, actions may be taken to dump the excess rejected heat to the ambient zone even after passing through the recovery heat exchanger. Accordingly, in some embodiments, after selectively directing the heat transfer fluid to the recovery heat exchanger in block 560 and potentially transferring heat to the refrigerant in block 566, the heat transfer fluid temperature may be determined at block 568. Selectively, the heat transfer fluid and excess heat may be directed to the discharge heat exchanger at blocks 570, 575, 580 before ultimately returning to the electricity generator at block 595. Implementation of the decision block 568 may comprise operating additional valves, tubing, instruments, and other components not shown in FIG. 1 or FIG. 2.

Figure 4:
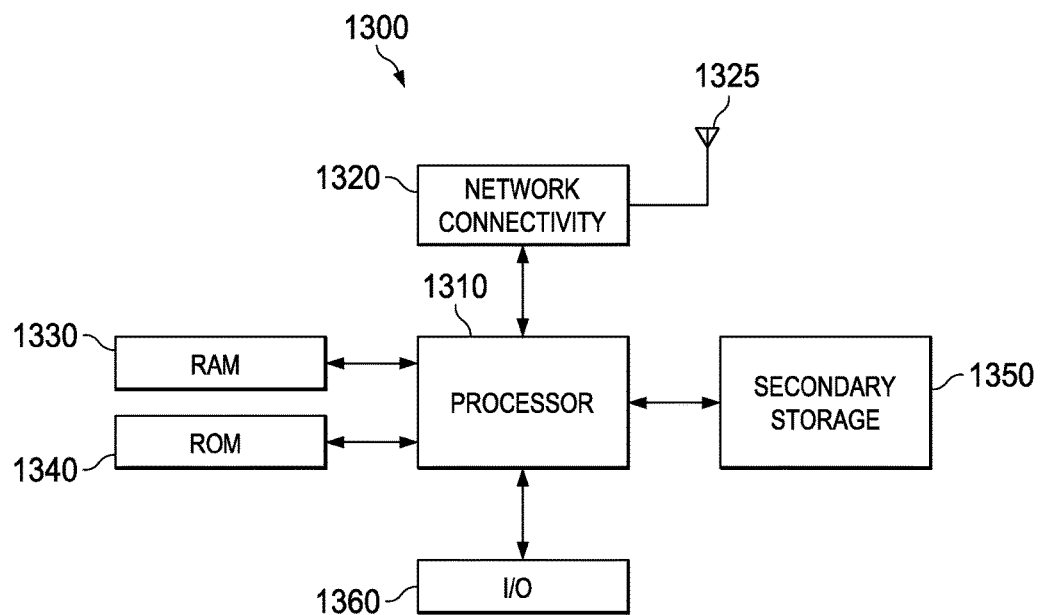
FIG. 4 is a representation of a general-purpose processor (e.g., electronic controller or computer) system suitable for implementing the embodiments of the disclosure.

FIG. 4 illustrates a typical, general-purpose processor (e.g., electronic controller or computer) system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, optical disk, or other drive). While only one processor 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

Continuing to reference FIG. 4, the network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs or instructions that are loaded into RAM 1330 when such programs are selected for execution or information is needed.

The I/O devices 1360 may include liquid crystal displays (LCDs), touch screen displays, keyboards, keypads, switches, dials, mice, track balls, voice recognizers, card readers, paper tape readers, printers, video monitors, transducers, sensors, or other well-known input or output devices. Also, the transceiver 1325 might be considered to be a component of the I/O devices 1360 instead of or in addition to being a component of the network connectivity devices 1320. Some or all of the I/O devices 1360 may be substantially similar to various components disclosed herein.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A method of operating a heating, ventilation, and/or air conditioning (HVAC) system, comprising:
    operating a device to produce electricity and rejected heat;
    powering a component of the HVAC system using the electricity produced by the device;
    selectively diverting a fluid within a circulatory loop from the device to:
        (1) a recovery heat exchanger disposed in an outdoor unit of the HVAC system to heat a refrigerant of the HVAC system using at least a portion of the rejected heat when the HVAC system is operated in a heating mode, wherein the heated refrigerant is carried from the recovery heat exchanger to an outdoor heat exchanger disposed in the outdoor unit of the HVAC system; and
        (2) a discharge heat exchanger disposed in the outdoor unit of the HVAC system to transfer at least a portion of the rejected heat to an ambient outdoor zone when the HVAC system is operated in a cooling mode; and
    selectively diverting at least a portion of the fluid within the circulatory loop leaving the device back to the device without passing the portion of the fluid through either of the recovery heat exchanger and the discharge heat exchanger in response to a temperature associated with the device being less than a temperature set point; and
    mixing the portion of the fluid diverted back to the device with a second portion of the fluid returning to the device from at least one of the recovery heat exchanger and the discharge heat exchanger.

2. The method according to claim 1, wherein the device is an electrical generator comprising an internal combustion engine.

3. The method according to claim 1, wherein the electricity powers a compressor of the HVAC system.

4. The method according to claim 1, wherein the recovery heat exchanger and the discharge heat exchanger are connected in parallel within the circulatory loop.

5. The method according to claim 1, further comprising:
    returning at least a portion of the rejected heat back to the device in response to selectively diverting the portion of the fluid within the circulatory loop leaving the device back to the device.

6. The method according to claim 1, further comprising:
    directing at least a portion of the rejected heat back to the device in response to a comparison between a temperature set point and a temperature associated with the device.

7. The method according to claim 1, further comprising:
    directing a first portion of the rejected heat back to the device and a second portion of the rejected heat to at least one of the recovery heat exchanger and the discharge heat exchanger of the HVAC system via a fluid within a circulatory loop.

8. A method of operating a heating, ventilation, and/or air conditioning (HVAC) system, comprising:
    circulating a fluid from a device of the HVAC system to a diverter valve of the HVAC system, the device being configured to generate at least one of electricity and heat;
    selectively circulating the fluid through the diverter valve to:
        (1) a recovery heat exchanger disposed in an outdoor unit of the HVAC system when the HVAC system is operated in a heating mode, wherein the recovery heat exchanger is configured to transfer heat from the fluid to a refrigerant of the HVAC system, and wherein the heated refrigerant is carried from the recovery heat exchanger to an outdoor heat exchanger disposed in the outdoor unit of the HVAC system; and
        (2) a discharge heat exchanger disposed in the outdoor unit of the HVAC system when the HVAC system is operated in a cooling mode, wherein the discharge heat exchanger is configured to transfer heat from the fluid to an ambient outdoor zone; and
    selectively circulating at least a portion of the fluid through a mixing valve configured to selectively direct the portion of the fluid back to the device without passing the portion of the fluid through either of the recovery heat exchanger and the discharge heat exchanger in response to a temperature associated with the device being less than a temperature set point; and
    mixing the portion of the fluid diverted back to the device with a second portion of the fluid returning to the device from at least one of the recovery heat exchanger and the discharge heat exchanger.

9. The method according to claim 8, further comprising:
electrically powering at least a portion of the HVAC system using electrical energy generated by the device.

10. The method according to claim 8, wherein the HVAC system comprises a heat pump system.

11. The method according to claim 8, wherein the fluid comprises at least one of water, a single phase coolant, and a two phase coolant.

12. The method according to claim 8, wherein the temperature set point comprises an operating temperature of the device.

13. A heating, ventilation, and/or air conditioning (HVAC) system comprising:
 a device configured to generate at least one of electricity and rejected heat;
 a recovery heat exchanger disposed in an outdoor unit of the HVAC system and configured to transfer heat from the fluid to a refrigerant of the HVAC system;
 a discharge heat exchanger disposed in the outdoor unit of the HVAC system and configured to transfer heat from the fluid to an ambient outdoor zone; and
 a circulatory loop comprising a diverter valve and a mixing valve, each of the diverter valve and the mixing valve being disposed in the outdoor unit of the HVAC system, wherein the diverter valve is configured to selectively circulate a fluid from the device to (1) the recovery heat exchanger of the outdoor unit of the HVAC system when the HVAC system is operated in a heating mode, wherein the recovery heat exchanger is configured to transfer heat from the fluid to a refrigerant of the HVAC system, and wherein the heated refrigerant is carried from the recovery heat exchanger to an outdoor heat exchanger disposed in the outdoor unit of the HVAC system, and (2) the discharge heat exchanger of the outdoor unit of the HVAC system when the HVAC system is operated in a cooling mode, wherein the discharge heat exchanger is configured to transfer heat from the fluid to an ambient outdoor zone, wherein the mixing valve is configured to selectively circulate at least a portion of the fluid back to the device without passing the portion of the fluid through either of the recovery heat exchanger and the discharge heat exchanger in response to a temperature associated with the device being less than a temperature set point, and wherein the portion of the fluid diverted back to the device mixes with a second portion of the fluid returning to the device from at least one of the recovery heat exchanger and the discharge heat exchanger.

14. The HVAC system according to claim 13, wherein the electricity generating device comprises a heat exchanger associated with the circulatory loop.

15. The HVAC system according to claim 13, wherein the device is configured to consume a hydrocarbon based fuel.

16. The HVAC system according to claim 13, wherein the electricity generating device comprises at least one of an internal combustion engine, a fuel cell, and a solar cell.

* * * * *